United States Patent
Przytula et al.

(10) Patent No.: US 7,650,272 B2
(45) Date of Patent: Jan. 19, 2010

(54) EVALUATION OF BAYESIAN NETWORK MODELS FOR DECISION SUPPORT

(75) Inventors: Krzysztof W. Przytula, Malibu, CA (US); Denver Dash, San Jose, CA (US)

(73) Assignee: HRL Laboratories, LLC, Malibu, CA (US)

( * ) Notice: Subject to any disclaimer, the term of this patent is extended or adjusted under 35 U.S.C. 154(b) by 480 days.

(21) Appl. No.: 10/692,697

(22) Filed: Oct. 23, 2003

(65) Prior Publication Data

US 2005/0091012 A1    Apr. 28, 2005

(51) Int. Cl.
*G06F 9/44*     (2006.01)
*G01B 5/28*     (2006.01)
*G01R 31/00*    (2006.01)
*G06F 17/00*    (2006.01)
*G06N 7/00*     (2006.01)
*G06F 11/00*    (2006.01)

(52) U.S. Cl. .................... 703/20; 706/45; 706/46; 706/47; 706/52; 706/55; 702/35; 702/59; 702/185; 714/25; 714/26

(58) Field of Classification Search .................... 703/20; 702/35, 59, 185; 706/45–47, 52, 55; 714/25, 714/26
See application file for complete search history.

(56) References Cited

U.S. PATENT DOCUMENTS

| | | | |
|---|---|---|---|
| 5,802,256 A | | 9/1998 | Heckerman et al. |
| 6,076,083 A * | | 6/2000 | Baker .......................... 706/52 |
| 6,408,290 B1 * | | 6/2002 | Thiesson et al. .............. 706/52 |
| 6,584,455 B1 * | | 6/2003 | Hekmatpour ................ 706/45 |
| 6,631,362 B1 * | | 10/2003 | Ullman et al. ................ 706/60 |
| 6,687,685 B1 * | | 2/2004 | Sadeghi et al. ............... 706/15 |
| 6,691,249 B1 * | | 2/2004 | Barford et al. ............... 714/25 |
| 6,785,636 B1 * | | 8/2004 | Darken et al. ................ 702/185 |
| 6,820,072 B1 * | | 11/2004 | Skaanning et al. ............ 706/52 |
| 6,832,069 B2 * | | 12/2004 | Stout et al. ................... 434/353 |
| 2001/0011260 A1 * | | 8/2001 | Skaanning et al. ............ 706/46 |
| 2002/0128943 A1 * | | 9/2002 | Schreckengast et al. ....... 705/36 |

(Continued)

OTHER PUBLICATIONS

Murphy, Kevin. 'Dynamic Bayesian Networks: Representation, Inference, and Learning'. Fall, 2000.*

(Continued)

*Primary Examiner*—Kamini S Shah
*Assistant Examiner*—Shambhavi Patel
(74) *Attorney, Agent, or Firm*—Tope-McKay & Assoc.

(57) ABSTRACT

A method, apparatus, and computer program product are presented for automatically evaluating Bayesian network models. Operations performed comprise receiving a Bayesian Network (BN) model including evidence nodes and conclusion nodes that are linked with the evidence nodes by causal dependency links, and where the evidence nodes have evidence states and the conclusion nodes have conclusion states. The states of conclusion nodes are set to desired conclusion states and corresponding probabilities of occurrence of evidence states are determined by propagating these states down the causal dependency links. Thus, samples of most likely states of the evidence nodes are generated. Then, states of the evidence nodes are set corresponding to the samples of the evidence states. These states are propagated back up the causal dependency links to obtain probabilities of the resulting states of the conclusion nodes. Finally, a representation is outputted for the probabilities of the states of the conclusion nodes.

64 Claims, 9 Drawing Sheets

U.S. PATENT DOCUMENTS

2003/0070003 A1* 4/2003 Chong et al. ............... 709/330
2003/0219764 A1* 11/2003 Imoto et al. ............... 435/6
2004/0078232 A1* 4/2004 Troiani ............... 705/2

OTHER PUBLICATIONS

Thompson et al. 'Evaluation of Bayesian Networks Used for Diagnostics'. IEEE Aerospace Conference, Mar. 2003.*

Nadkarni et al. "A Bayesian Network Approach to Making Inferences in Causal Maps" European Journal of Operational Research 128 (2001).*

Chien, et al. "Using Bayesian Network for Fault Location on Distribution Feeder", IEEE Transactions on Power Delivery, vol. 17, No. 13, Jul. 2002.*

Hernandez, et al. "A Monto-Carlo Algorithm for Probabilistic Propagation in Belief Networks based on Importance Sampling and Stratified Simulation Techniques", Nov. 1996.*

Pappas et al. "A New Measure for the Accuracy of a Bayesian Network", MICAI 2002, pp. 411-419.*

Spiegelhalter, et al. "Techniques for Bayesian Analysis in Expert Systems", Annals of Mathematics and Artificial Intelligence, 2 (1990).*

Santos, Eugene. "Verification and Validation of Bayesian Knowledge-Bases", Data and Knowledge Engineering 37, 2001.*

Murphy, Kevin. "Dynamic Bayesian Networks: Representation, Inference and Learning", 2002.*

D. Heckerman, J.S. Breese, K. Rommlese, "Decision-Theoretic Troubleshooting," Communications of ACM, Mar. 1995, vol. 38, No. 3, pp. 49-57.

* cited by examiner

EVALUATION OF BAYESIAN NETWORK MODELS FOR DECISION SUPPORT

BACKGROUND OF THE INVENTION (1) Technical Field

The present invention relates to a method and software tool for evaluation of Bayesian Network (BN) models for decision support. More specifically, the present invention relates to a technique for predicting the accuracy of a BN model and determining what parameters may be providing inaccuracies in the model either because of inaccurate modeling or because of real-world observations.

(2) Discussion

The advent of artificial intelligence within computer science has generated an abundance of decision-support systems. Decision-support systems are computer systems in which decisions, typically rendered by humans, are recommended and sometimes made. In creating decision-support systems, computer scientists seek to provide decisions with as high a level of accuracy as possible. Thus, computer scientists strive to create decision-support systems that are equivalent to or more accurate than a human expert. Applications of decision-support systems include medical diagnosis, troubleshooting computer networks, or other systems where a decision is based upon identifiable criteria.

Bayesian networks (BN), known also as belief networks, are one example of a modeling technology on which decision-support system can be based. BN models are graphical probabilistic models that result from combining graph and probability theories. The BN models can be created using information obtained from experts, from design documentation, and from data. BN models can also be learned entirely from data.

Before BN models can be used in decision support aids, they have to be extensively evaluated. A typical evaluation relies on comparing the answers suggested by the BN models with those expected by the experts. The evaluation is generally limited to a relatively small number of decision cases, for which the experts know the correct answer.

A conventional evaluation of BN models is typically based on a limited ad-hoc testing. First, a set of cases is identified for which a correct decision is known. The cases may come from the data or from the expert. Then, the BN is queried for decision recommendations based on the evidence available in the cases. The quality of the BN model is determined on the basis of comparison the recommendations produced by the model for the cases with the correct decisions. The number of the cases is usually very limited and their selection is driven by their availability rather than proper coverage of the decision domain. The conventional evaluation is almost always incomplete and therefore unreliable. What is needed is a systematic approach for evaluating the performance of a BN model.

In D. Heckerman, J. S. Breese, K. Rommlese "Decision-Theoretic Troubleshooting," Communications of ACM, March 1995, Vol. 38, No. 3, pp. 49-57, planning of test and repair sequences for cost-optimal troubleshooting is described. The systems under going troubleshooting are modeled using BN. The paper describes finding the ordering of test and repair steps that results in minimal cost of troubleshooting. Monte Carlo methods are applied to generate test examples from the BN. The examples are the basis of comparison of the author's planning method and other methods known in the literature.

In U.S. Pat. No. 5,802,256 to D. Heckerman, D. Geiger, D. M. Chickering, entitled "Generating Improved Belief Networks" a method for creating BN models for decision support problems from expert knowledge and from data is described. The '256 patent describes integrating the two sources of information to obtain a model of better performance than that originating from data or expert knowledge only. The BN is created using a software tool referred to as a network generator.

A technical problem faced by all those who use BN in real-life decision support is that the BN models are designed for critical decision support problems, e.g. diagnostics, and are very complex and, as such, need to be very carefully evaluated before they can be used in practice. Thus to accomplish this evaluation task, an automated evaluation method, which covers all the parts of the model and all the most probable decision cases, is needed.

SUMMARY OF THE INVENTION

The present invention relates to a method, apparatus, and computer program product for evaluation of Bayesian Network (BN) models for decision support. In one aspect of the present invention, operations of the invention include receiving a Bayesian Network (BN) model including evidence nodes and conclusion nodes, where the conclusion nodes are linked with the evidence nodes by causal dependency links, and where the evidence nodes have evidence states and the conclusion nodes have conclusion states. Another operation of the invention is setting the states of the conclusion nodes to desired conclusion states and determining, by propagating down the causal dependency links, the corresponding probability of occurrence of evidence states of the evidence nodes and producing, from the probability of occurrence, a plurality of samples of most likely states of the evidence nodes. Still another operation of the present invention is that of setting the states of the evidence nodes to states corresponding to the plurality of samples of the evidence states, and propagating the evidence states back up the causal dependency links to the conclusion nodes, to obtain a plurality of probabilities of the resulting states of the conclusion nodes. Yet another operation of the invention is that of outputting a representation of the plurality of the probabilities of the states of the conclusion nodes.

In another aspect of the invention, the BN model further includes at least one auxiliary node causally linked between at least one evidence node and at least one conclusion node.

In still another aspect, the sampling is performed by a Monte Carlo algorithm.

In yet another aspect, the outputted representation is a complete representation of probabilities of states for all conclusions given a particular set of combinations of conclusion states.

In a further aspect, the outputted representation is a graphical representation.

In yet a further aspect, the outputted representation is a matrix of averages of probabilities of the conclusion states for implicated conclusions versus a selected set of combinations of conclusion states; whereby a user can determine the accuracy of the BN model's propensity to yield proper conclusions.

In a still further aspect, the outputted representation is a graphical representation in the form of a two-dimensional intensity matrix and a three-dimensional bar chart.

In a yet further aspect, the conclusion nodes are weighted by weights representing their importance; whereby the accuracy of the BN model's propensity to yield proper conclusions may be weighted for particular conclusions based on their relative importance.

In another aspect, the BN model models a diagnostic domain, with the conclusion nodes representing component failures or diseases, the evidence nodes representing recognizable symptoms of those failures or diseases, and the auxiliary nodes representing additional information useful, in conjunction with the evidence nodes and conclusion nodes.

BRIEF DESCRIPTION OF THE DRAWINGS

The objects, features and advantages of the present invention will be apparent from the following detailed descriptions of the preferred aspect of the invention in conjunction with reference to the following drawings, where.

DETAILED DESCRIPTION

The present invention to a method and software tool for evaluation of Bayesian Network (BN) models for decision support. More specifically, the present invention relates to a technique for predicting the accuracy of the model and determining what parameters may be providing inaccuracies in the model either because of inaccurate modeling or because of real-world observations. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of aspects. Thus, the present invention is not intended to be limited to the aspects presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

In order to provide a working frame of reference, first a glossary of terms used in the description and claims is given as a central resource for the reader. Next, a discussion of various physical aspects of the present invention is provided. Finally, a discussion is provided to give an understanding of the specific details.

(1) Glossary

Before describing the specific details of the present invention, a centralized location is provided in which various terms used herein and in the claims are defined. The glossary provided is intended to provide the reader with a general understanding for the intended meaning of the terms, but is not intended to convey the entire scope of each term. Rather, the glossary is intended to supplement the rest of the specification in more accurately explaining the terms used.

Means—The term "means" as used with respect to this invention in the context of software generally indicates a set of operations to be performed on a computer, and may represent pieces of a whole program or individual, separable, software modules. Non-limiting examples of "means" include computer program code (source or object code) and "hard-coded" electronics (i.e. computer operations coded into a computer chip). The "means" may be stored in the memory of a computer or on a computer readable medium.

(2) Physical Aspects

The present invention has three principal "physical" aspects. The first is an apparatus. The second physical aspect is a method, typically in the form of software, operated using a data processing system (computer). The third principal physical aspect is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. These aspects will be described in more detail below.

Figure 1:
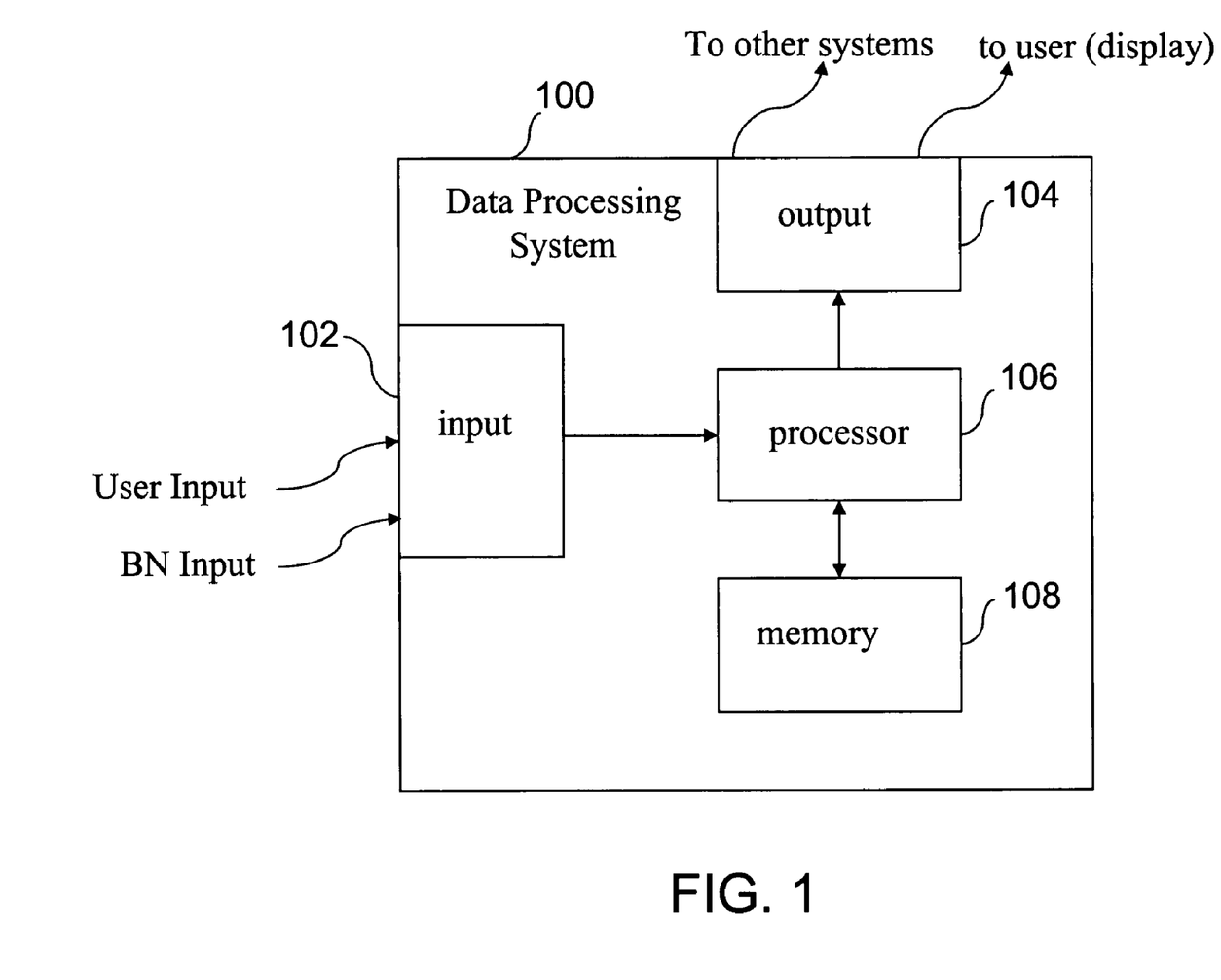
FIG. 1 is a block diagram of a general computer system for use with the present invention.

A block diagram depicting the components of a computer system used in the present invention is provided in FIG. 1. The data processing system 100 comprises an input 102 for receiving information from a user and/or from other components. Information received may include BN models, as well as input from devices such as keyboards, mice, other peripherals such as storage devices, other programs, etc. The input 102 may include multiple "ports." An output 104 is connected with the processor for providing information for transmission to other data processing systems, to storage devices, to display devices such as monitors, and to other mechanisms for presentation in user-readable forms. Output may also be provided to other devices or other programs, e.g. to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software to be manipulated by commands to the processor.

Figure 2:
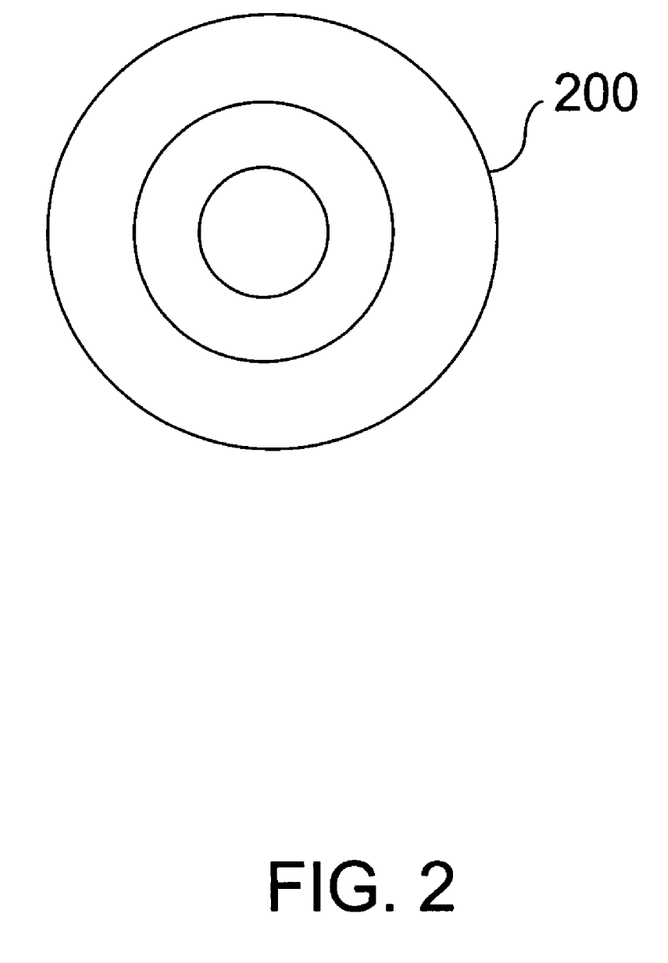
FIG. 2 is an illustrative diagram of a computer-readable medium aspect of the present invention.

An illustrative diagram of a computer program product embodying the present invention is depicted in FIG. 2. The computer program product 300 is depicted as an optical disk such as a CD or DVD. However, as mentioned previously, the computer program product generally represents computer readable code stored on any compatible computer readable medium.

(3) Introduction

The present invention provides a method and software tool for evaluation of Bayesian Network (BN) models for decision support. More specifically, the present invention relates to a technique for predicting the accuracy of the model and determining what parameters may be providing inaccuracies in the model either because of inaccurate modeling or because of real-world observations.

In general, the present invention provides for a complete, automated, exhaustive and informative evaluation of the BN for decision support. The output of the present invention may be used to inform the user about the expected performance of the model in decision support tasks. Moreover, the present invention points to the parts of the model which are responsible for errors in suggested decisions and helps in identifying changes to the model that could improve its performance. One result of the present approach to BN evaluation is that the time from design to practical application of decision support tools is shortened. In another aspect, the present approach provides a solid basis for estimating the performance of the tools before they are released for use.

One embodiment of the present invention is a systematic approach to evaluation of BN implemented in a software tool. The tool takes in a BN model and produces graphs characterizing the model performance. In another embodiment of the present invention, a method for interpreting the graphs to identify the parts of the BN models, which are responsible for inadequate performance is provided. Further, the embodiments provide a way to analyze the domain being modeled to discover how well the domain lends itself to accurate decision making.

The method and software for evaluation of BN models for decision support described herein applies to all BNs, independent of the way in which they were created. One embodiment of the present invention provides a systematic approach to evaluating the performance of BN. In the following examples a diagnostic BN model will be used; however, the method is applicable to BN models used for any decision support problem.

(4) Discussion

For purposes of the following discussion, it is assumed that the BN model meets all of the classic assumptions of BNs with discrete, continuous or mixed distributions, as described in standard textbooks of the field, such as Finn V. Jensen, "Bayesian Networks and Decision Graphs," Springer Verlag, New York, 2001.

The following discussion utilizes, as an example, system failure diagnostics, which is one of the most common applications of BN. Generally, a technician is asked to make a decision about which component(s) to repair given some observations of the system. The evaluation tool is designed to assist the technician in the task. The tool provides assistance by using the BN model of the system failures and observations. In the BN model, conclusion nodes are all the nodes representing the system failures that need to be diagnosed. Evidence nodes are all the nodes that model symptoms and test results. During diagnosis, state information for some of the evidence nodes is obtained, e.g. by determining some symptoms are present or absent and that some tests have passed or failed. The decision support tool for diagnosis will produce the probability of the system failures. Knowing the probability, the user will decide which components to repair.

The decision support applications based on BN models generally use authoring tools and libraries of probabilistic algorithms. There are several such tools and libraries available as off-the-shelf software, e.g. Hugin, Netica, or as freeware/shareware e.g. MSBN or GeNIe. One skilled in the art will appreciate how these different tools are used, and an extensive discussion regarding the use of these tools is outside the scope of this discussion. The disclosed method is independent of the specific tools and may be used with a BN model created using any one of them.

Figure 3:
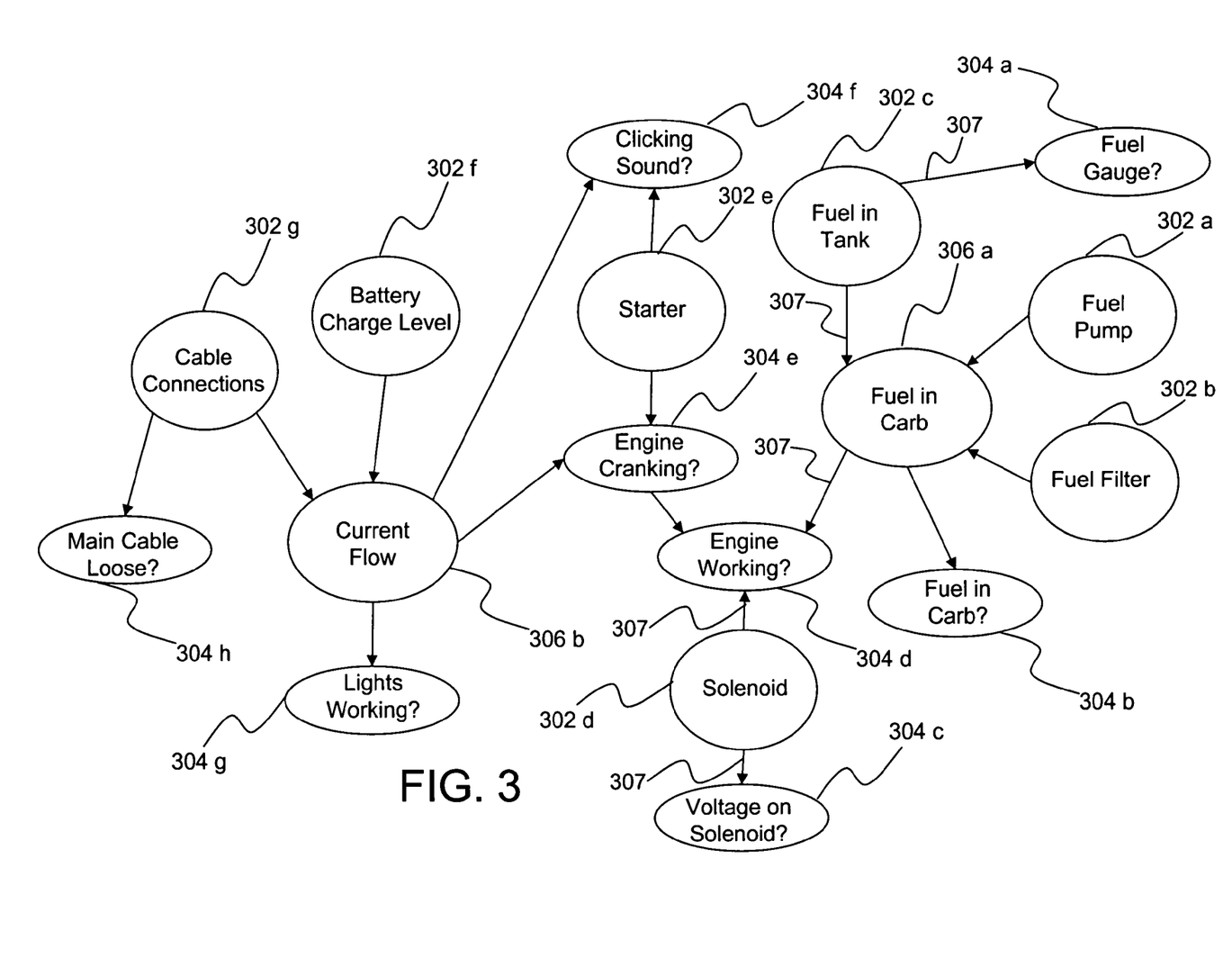
FIG. 3 is a diagram of a Bayesian Network (BN) model provided as an example to illustrate the use of the present invention—specifically, the example BN model is presented as a simple BN model for the diagnosis of automobile problems.

FIG. 3 depicts a BN capturing dependencies between the failures and observations of a diagnostic problem, a simplified car diagnosis. In this example, conclusion nodes 302a-302g represent parts that may fail. While evidence nodes 304a-304h represent indicators that a technician will see or detect. In addition, the BN includes auxiliary nodes 306a and 306b, which are used for the sake of model clarity. Links 307 between the nodes 302a-302g, 304a-304h, and 306a and 306b signify the dependencies between nodes 302a-302g, 304a-304h, and 306a and 306b of the BN.

One skilled in the art will appreciate that the disclosed method does not require a causal model, but if causal links are not known then knowledge of a total temporal ordering of the variables is desired. In the case of a causal model, the total temporal ordering can be found by performing a topological sort of the network (i.e., ordering the nodes such that if node A is a parent of node B then A comes before B in the ordering). One skilled in the art will appreciate that FIG. 3 shows only the structure of the model, and that all the nodes 302a-302g, 304a-304h, and 306a and 306b will have numerical parameters (not shown) in form of probabilities: prior for root nodes and conditional for all the remaining nodes.

The disclosed method is for evaluation of the BN model and the decision domain. The method provides information that helps in answering the following two questions: 1) "How good is the model as a diagnostic assistant?" This question can be further broken down into two sub-questions: (a) "How closely does the model reflect reality?" and (b) "Given that the model perfectly reflects reality, how does the domain being modeled lend itself to correct diagnosis?" and 2) "Which nodes/parameters are responsible for ambiguous or incorrect diagnostic suggestions?" This question can also be broken down into two components: (a) "Which nodes/parameters are being incorrectly modeled?", and (b) "Given that the model perfectly reflects reality, which variables in the real world can not be resolved given the observations being modeled?"

The evaluation is implemented using an algorithm, which has three basic steps: 1) Failure propagation; 2) Diagnosis; and 3) Visualization.

In short, failure propagation includes acts of:
selecting one or more specific failures;
setting the states of nodes representing failures in the BN to one of the possible defective states;
setting the states of the remaining "failure" nodes that are root nodes of the BN to the state "non-defective;" and
determining the state of the remaining nodes (using Monte Carlo sampling);
    finding the next node in the list of temporally ordered nodes;
    using BN inference to calculate the posterior distribution of that node given the evidence so far;
    determining the state of the node by sampling its posterior distribution; and
    stop when states of all nodes have been determined.
The diagnosis includes acts of:
assuming the states of all the observation nodes to be those determined in the failure propagation step; and
computing the posterior probability for all the "failure" nodes (not only the nodes selected as "defective" in the failure propagation step) given the states of the "observation" nodes.

The visualization is a general act of presenting a visual representation of the evaluation results of the BN. In particular, for example, the visualization step here includes generating a complete graph for failure probabilities for each sample and generating two or three-dimensional matrices of averaged probabilities across all samples. The failure propagation, diagnosis, and visualization steps will be discussed in greater detail below.

Failure Propagation

Figure 4:
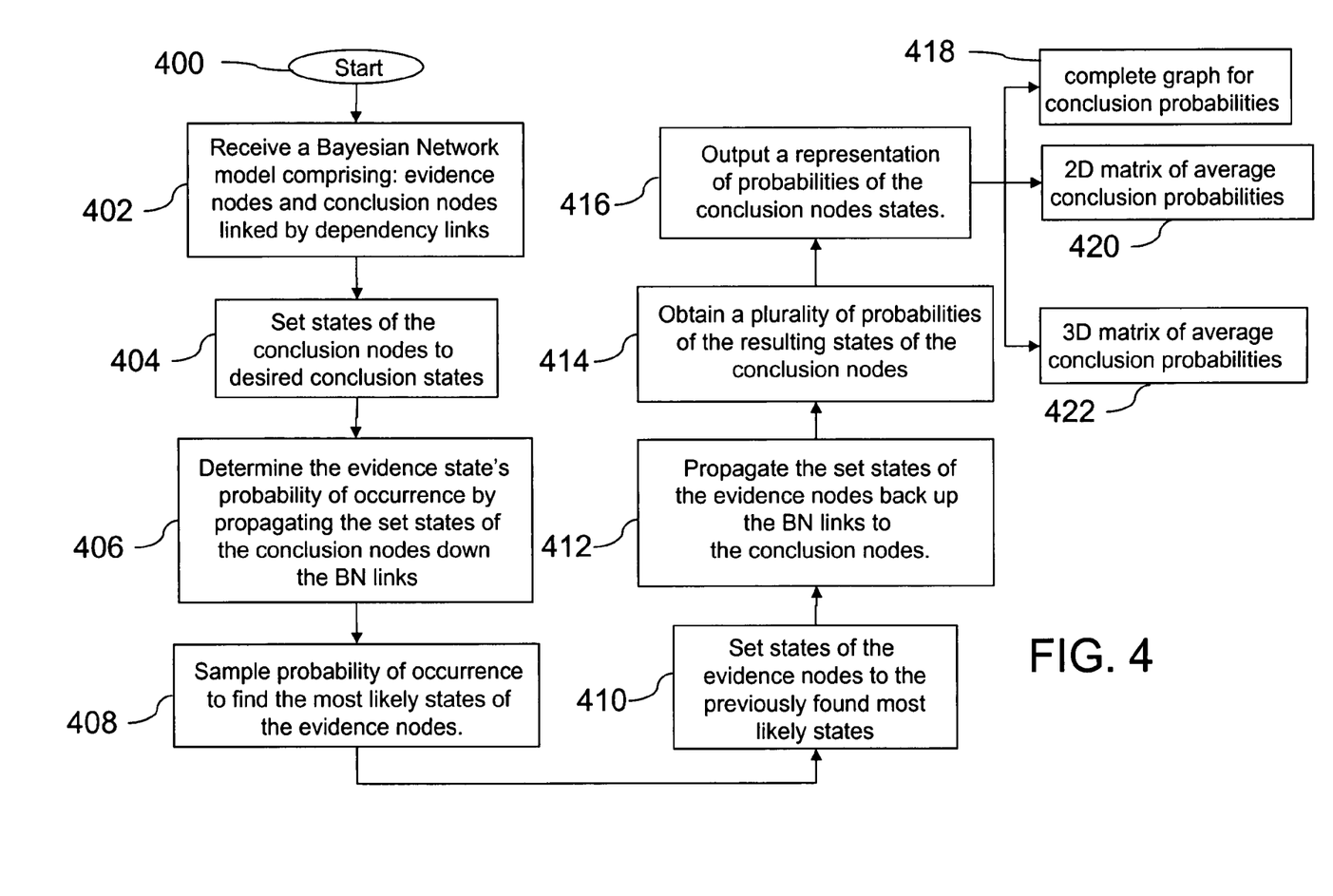
FIG. 4 is a flowchart depicting acts comprising a method of the present invention.

FIG. 4 is a flowchart of the operations of the algorithm. After starting 400, the computer system performs an act of receiving a BN model 402. The BN model comprises evidence nodes 304a-304h and conclusion nodes 302a-302f linked by dependency links 307 (as previously shown in FIG. 3) and all the probabilities defined for the nodes. Next, the computer system performs an act of setting the conclusion states of the conclusion nodes 302a-302f to desired conclusion states 404, with the desired conclusion states representing a potential failure scenario within the system described by the BN model. Next an act is performed of determining the probability of occurrence of the evidence states 406 associated with each of the evidence nodes 304a-304g. This is accomplished by propagating the previously set conclusion states of the conclusion nodes 302a-302f down the dependency links. One skilled in the art will appreciate that the act of determining the probability of occurrence of the evidence states 406 may be preformed through a probabilistic inference, where each non-conclusion node 304a-304g, and 306a and 306b is addressed temporally and BN inference is used to calculate a posterior distribution of the non-conclusion node given the probabilities previously calculated. One skilled in the art will appreciate that the probability of occurrence of the evidenced states is a typical output of commercial software such as GeNIe or Hugin.

Next, the computer system performs an act of sampling 408 each of the evidence nodes' 304a-304g posterior distribution.

Diagnosis

The result of Monte Carlo sampling is then used by the computer system to perform an act of setting the evidence states 410 of the evidence nodes 302a-302f. Next the computer system performs an act of propagating the set of evidence states 412 of the evidence nodes 302a-302f back up the dependency links to the conclusion nodes 304a-304g. The result is the computer system is now able to perform the act of obtaining a plurality of probabilities 414 of the resulting states of the conclusion nodes 304a-304g. One skilled in the state of art will recognize that this is done by probabilistic inference, i.e. in a way identical to the failure propagation step.

The acts of setting the evidence states 410 of the evidence nodes 302a-302f and of propagating the set of evidence states 412 of the evidence nodes 302a-302f back up the dependency links to the conclusion nodes 304a-304g are preformed many times for each specific selection of the system failures. Thus, system failures are selected, and a set of likely evidences resulting from the failures are obtained by sampling. The model may be then diagnosed to see if from the evidences the failures may be accurately detected. The system failures may be selected systematically, e.g. each conclusion node 304a-304g is set to fail separately, then all pairs of conclusion nodes 304a-304g etc. or randomly according to the probability of failure for each conclusion node 304a-304g.

Visulation

Figure 6:
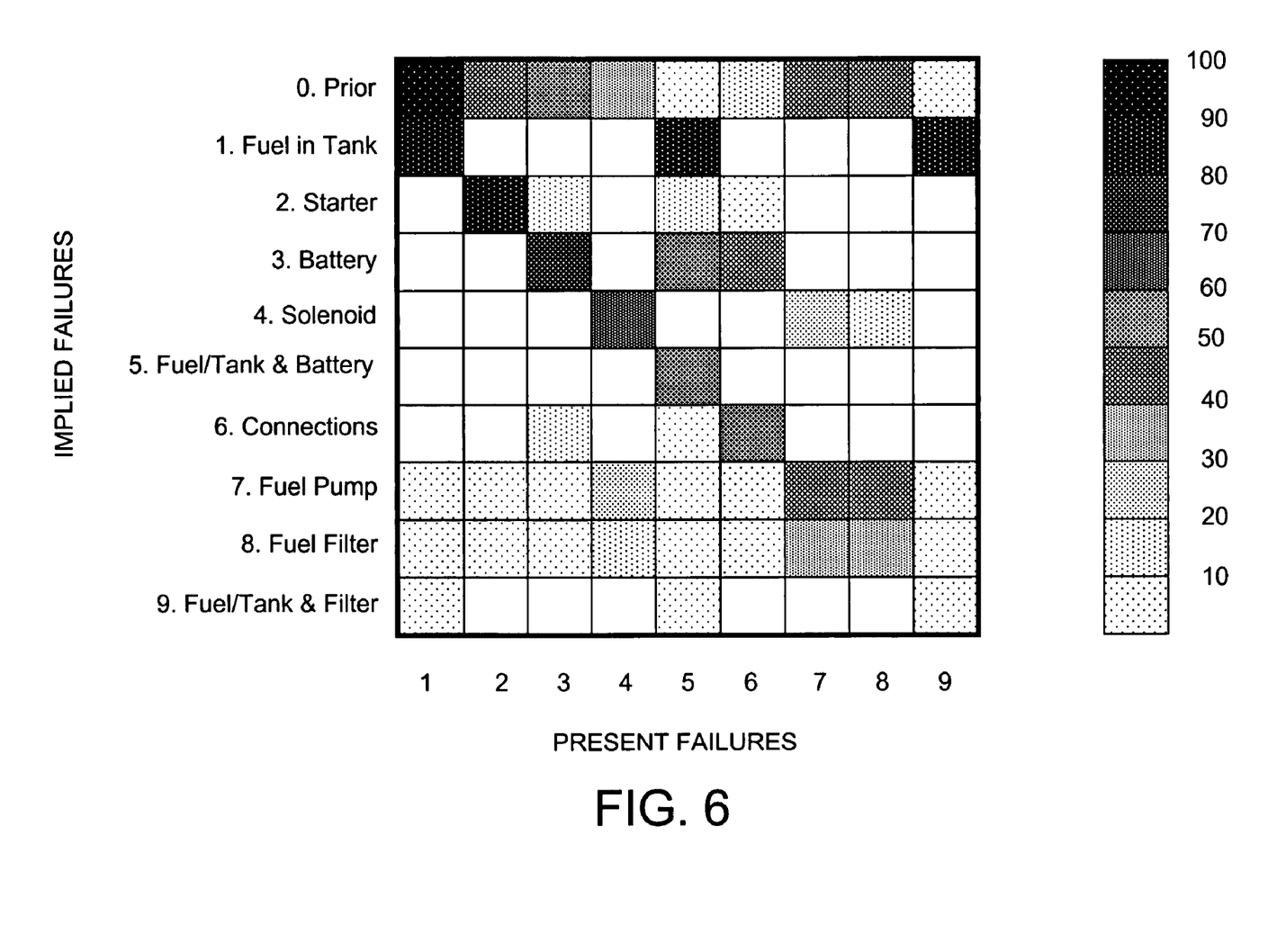
FIG. 6 is a two-dimensional matrix representation of average probabilities for the failure states depicted in FIG. 5.
Figure 7:
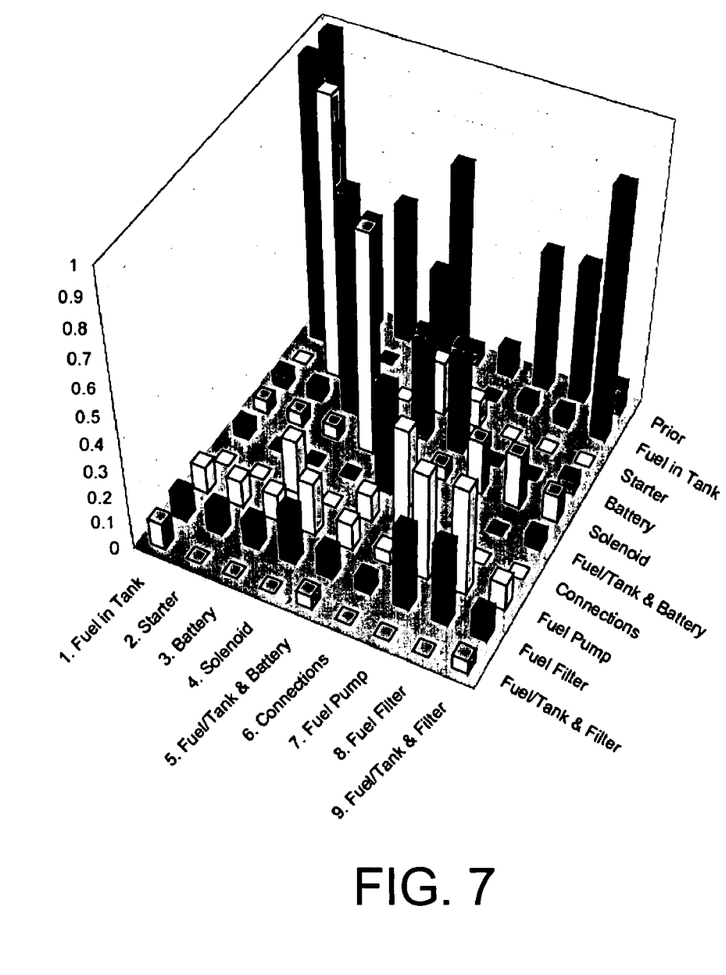
FIG. 7 is a three-dimensional graph representation of the average probabilities for the failure states depicted in FIG. 5.

In one embodiment, after the diagnosis stage is completed, the output may be visualized. The computer system performs an act of outputting a representation of probabilities of the conclusion nodes states 416 obtained during the diagnosing stage. There are many ways in which this data may be visualized, for example the visualization may comprise a complete graph for failure probabilities 418 (as shown in FIG. 5), as a two-dimensional matrix of average failure probabilities 420 (as shown in FIG. 6) or a three-dimensional matrix of average failure probabilities 422 (as shown in FIG. 7).

Figure 5:
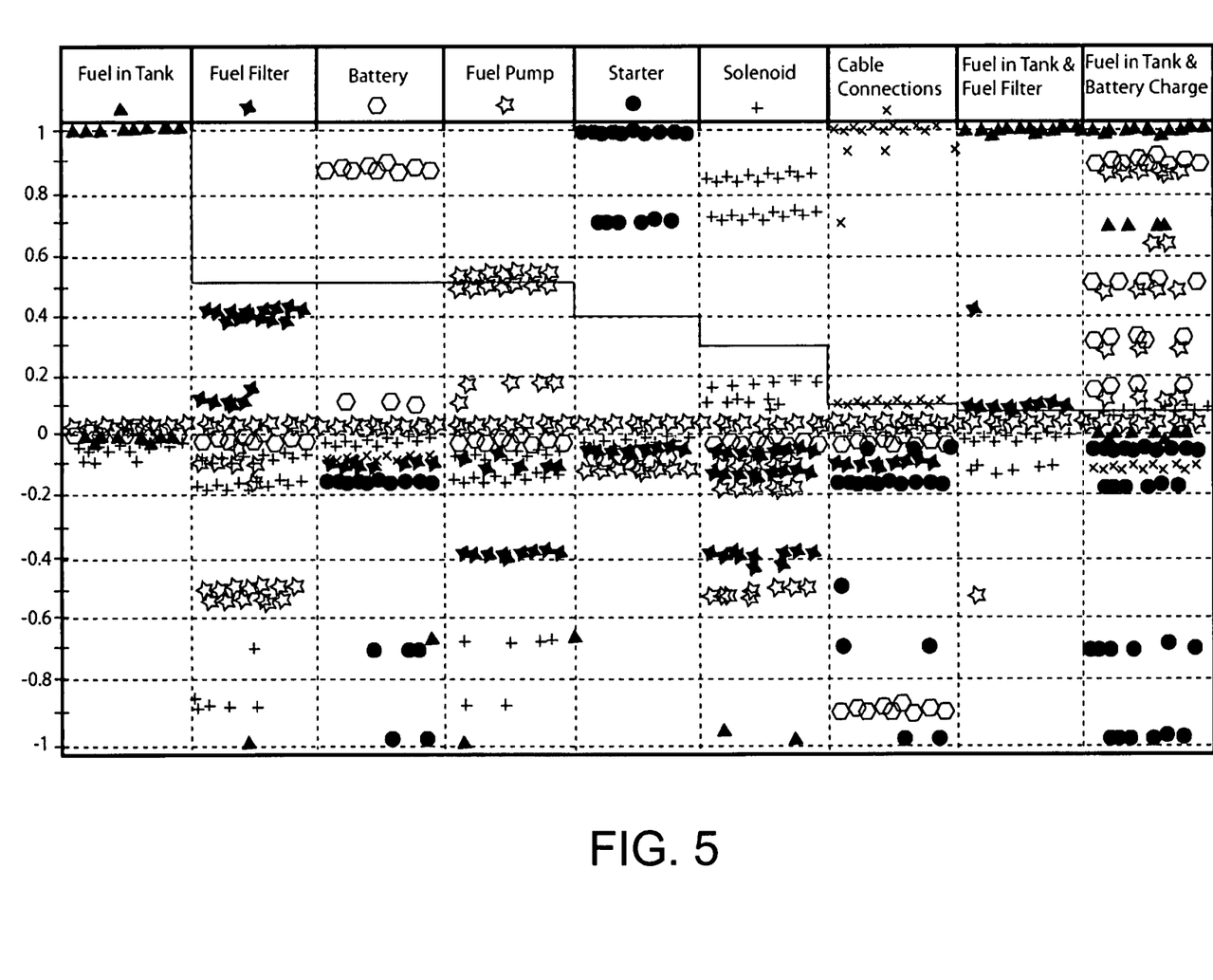
FIG. 5 is a complete graph representing all failure states of the BN depicted in FIG. 3.

A complete graph of failure probabilities for the example BN of FIG. 3 is presented in FIG. 5. In the generation of FIG. 5, each conclusion node 302a-302g is individually set to "defective" and the probabilities of the observations are sampled one hundred times for each of the conclusion nodes. One skilled in the art will appreciate that the quality of the evaluation will increase (up to a point) with the number of iterations. However, as will also be appreciated, increasing the number of iterations also increases the processing time. A set of likely states of each observation node given the state of each conclusion node was generated. Next, the posterior probabilities of each failure given the set of likely observation states were calculated. In addition, the two most likely pairs of failures (Fuel-in-tank/Battery Charge and Fuel-in-tank/Fuel Filter) were set to "defective" simultaneously and observation states were generated from these pairs. Thus, a total of nine hundred cases were generated.

The complete graph of FIG. 5 provides a pictorial representation of all of these samples: each point on the x-axis of this graph corresponds to a single sample, and the y-axis denotes the posterior value for each failure or failure/pair in the network. If a given failure was part of the set of conclusion nodes 302a-302f that were set to "defective" in the simulation, then its posterior is shown as a positive (>0) value; whereas, if the failure was not in the faulty set, then it's posterior is shown as a negative value. The cases are ordered from the left of the graph to the right so that the cases for the nodes that are most likely to be defective come first followed by the less likely cases. The step-like line in the graph indicates the prior probability of each failure or failure pair (scaled as a proportion of the largest prior).

FIG. 5 presents a complete view of what happens when various failures or sets of failures are present. A quick scan of the bottom half of the graph indicates which nodes can be implicated when particular evidence is present. It also provides specific information about the possible discrete levels that each failure's posterior probability can take, which assists in deciding about when a failure should be deemed to be present.

In this automobile diagnosis example, it is apparent that the failures "Fuel Filters" and "Fuel Pump" both very frequently implicate each other, and both occasionally implicate the "Solenoid," which, in turn, occasionally implicates each of them. These symmetrical implications are due to the fact that each of these failures have similar observations in the model. All of them can cause the engine to stop working, and "Fuel Filter" and "Fuel Pump" both have an impact on whether fuel gets into the carburetor. One might conclude, based on this graph, that if the model perfectly reflects reality, it will not be possible to distinguish between these three failures unless additional observations or tests are provided to help to separate these three failures.

One can also see, by looking at the complete graph of FIG. 5, that while the "Cable Connections" failure strongly implicates battery "Charge Level" failure, the converse is not true. This happens because, while again, both of these components impact the model in similar ways, a drained battery is much more likely to occur than a loose cable connection. Thus, when a cable connection is faulty, one would immediately assume the battery is dead, but not the converse. From this information, one might conclude that a test to distinguish between these two components e.g. the voltage of the battery should be added to the system and model.

A two-dimensional matrix of failure-diagnosis averages from the results shown in FIG. 5 is depicted in FIG. 6. The two-dimensional matrix is a more compact, view of the data generated. The x-axis denotes the failures or pairs of failures that were set to "defective," and the y-axis denotes the average posterior probability generated for each failure or pair, given that the failure or pair on the x-axis was set to "defective." The top row of the matrix represents the prior probabilities of occurrence of the failures or pairs. The average probability values are indicated by a darkness scale, ranging from white (i.e. lowest value) to black (i.e. the highest value). The two-dimensional matrix represents the information contained in the complete graph shown in FIG. 5, in a much more concise way. A scan of the off-diagonal elements indicates when a misdiagnosed failure is likely. A scan of the diagonal elements indicates how well a true failure can be detected. If the model was perfectly able to distinguish between the failures, then the diagonals for all the single failures might be around 100% and the off-diagonals might be around 0%. If the pairs were perfectly distinguishable, then in addition to the diagonal value being 100%, the off diagonals corresponding to the components that makeup the pairs will also be implicated near the 100% level.

To reflect this, the axes of the two-dimensional matrix are ordered according to the value of the diagonal elements so that the failures or pairs that are most likely to be correctly identified as "defective" will appear on the left/top of the graph. The failures that are hard to identify will appear on the right bottom. In general, detecting very likely failures is more important than detecting those that are unlikely. Thus a quick scan of the top row (the priors row) of the matrix allows for identification of failures that have a high probability of occurrence. Those of them that appear in the right-bottom corner of the matrix are the most troublesome in diagnosis. In the example, nodes 7 and 8 (labeled "Fuel Filter" and "Fuel Pump," respectively) have fairly high priors and their diagonal elements lie to the right. Also in this example, it is possible to see the symmetric implications of "Fuel Filter" and "Fuel Pump," and it is also possible to clearly see the asymmetric implication of "3. Battery" by "6. Connections." Even relatively minor implications are evident in this graph, for example, the cross-implication of "7. Fuel Filter," "8. Fuel Pump," and "4. Solenoid."

The conciseness of this representation has the drawback of presenting only average values, so it may not be possible to distinguish between a component that implicates another component many times at a low level (a good situation) versus one that implicates another component fewer times at a high level (less desirable situation). This information must be retrieved from the complete graph in FIG. 5.

A three-dimensional matrix representation for the example network is shown in FIG. 7. The three-dimensional matrix is very similar to the two-dimensional matrix depicted in FIG. 6, only instead of viewing the values using darkness scale, they are represented as a full-perspective three-dimensional map of the data. This representation has many of the advantages of the two-dimensional map, but also provides a better feeling for the relative heights of the levels than is possible with the darkness scale. The drawback to the three-dimensional matrix is that it can be difficult to interpret with just a single angle of view. It is most effective when it can be rotated and viewed at several angles to see around walls or spikes that might be present in the data.

These figures provide only a few examples of ways in which data may be presented by the present invention, and is not intended to be considered limiting. Rather, a variety of data representations may be made in order to permit varying ways of interpreting results.

As discussed, the present invention can be embodied as a software tool operating on a general purpose computer system. As an example, an implementation may be a Windows-executable program written in object-oriented C++ code. The program takes in a BN model file of the decision domain. The file can, for example, be in .dsl (i.e. GeNIe), .net (i.e. Hugin) or .dne (i.e. Netica) format. The present invention takes such a file and produces a graphical representation for evaluation of the network performance. As discussed, the present invention produces graphical output, examples of which were mentioned above—a complete graph, a two-dimensional matrix, and a three-dimensional matrix.

As a non-limiting example, the present invention was operated on several small sample BNs and on two larger networks used in real-life troubleshooting of a large electromechanical system. One of the large models (#1) contained 169 nodes with 47 conclusion nodes. The other model (#2) contained 98 nodes with 36 conclusion nodes. The evaluation of these networks, sampling each failure (no pairs) 100 times took about 20 minutes for #1 and about 15 minutes for #2, running on 1.2 MHz Pentium IV PC. Particular aspects of the results for these examples are presented below, as it provides a useful illustration regarding the interpretive value of the present invention.

Figure 8:
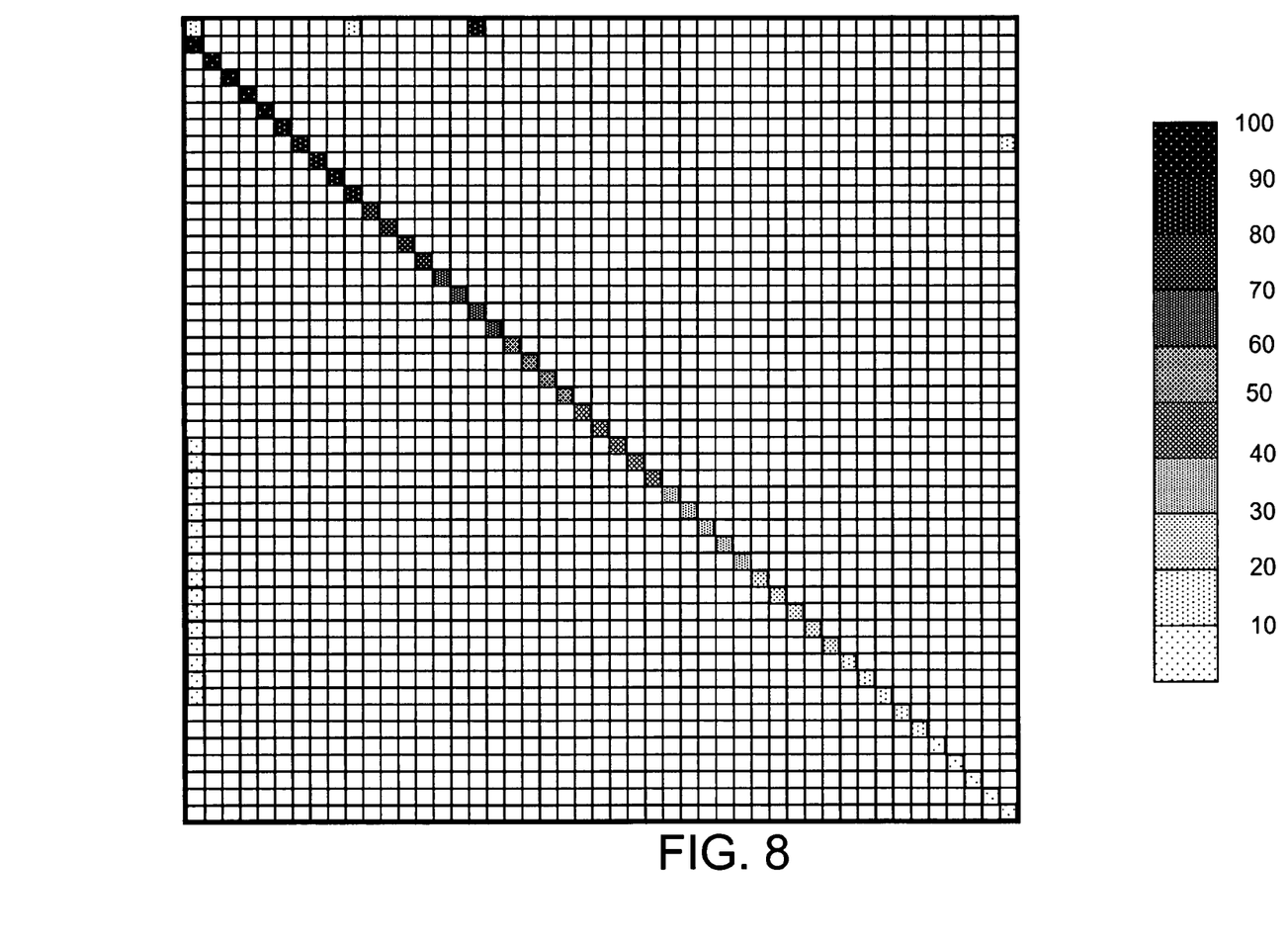
FIG. 8 is a is a two-dimensional matrix representation of average probabilities for a larger and nearly-perfect BN model.

The large model #1 is an example of a nearly perfect diagnostic model, results for which (in the form of a two-dimensional matrix functionally similar to that shown in FIG. 6) are depicted in FIG. 8. The falsely implicated failures (off-diagonal elements) have average probabilities much smaller then the true failures (diagonal elements). This evaluation was confirmed by follow-up studies showing that a diagnostic support tool based on the large #1 model correctly classified records about 95% of the time.

Figure 9:
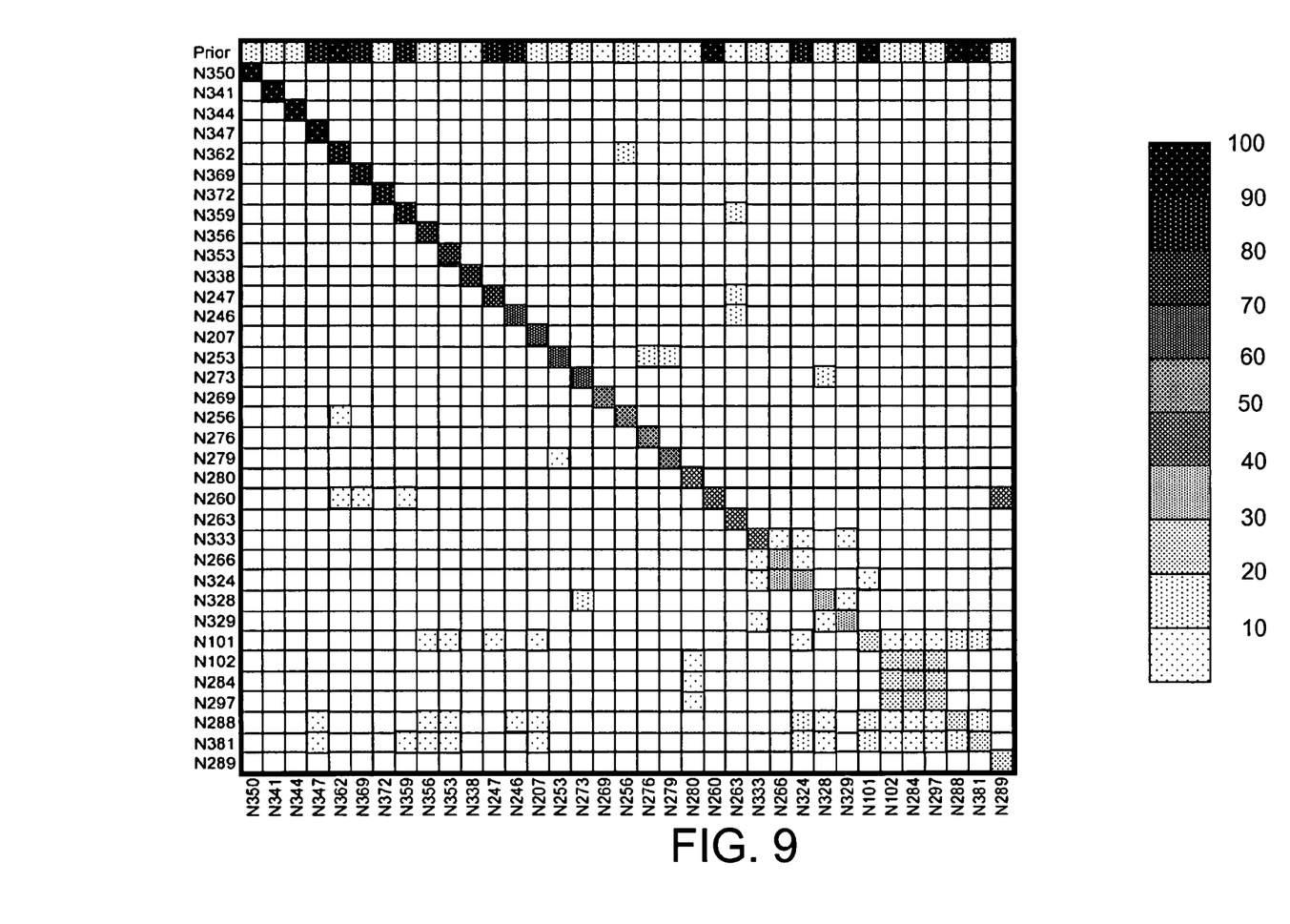
FIG. 9 is a two-dimensional matrix representation of average probabilities for a larger and not-so-nearly-perfect BN model.

On the other hand, the two-dimensional matrix for the large model #2 presents a much more complicated picture, results for which are depicted as a two-dimensional matrix in FIG. 9. The first observation, looking across the top row of priors, is that there are 4 or 5 darker patches near the far right of the graph. These 5 failures are very likely to occur (in fact, the most common 3 failures are part of this set), and have very low values on the diagonal (i.e. are poorly recognized as true failures). To make matters worse, the 3 failures most likely to be defective (N101, N288, and N381) are strongly coupled: they all implicate each other at about the same rate as that they are implicated themselves. It is thus apparent that there is a need for additional tests for these failures. The test must implicate strongly the real failure and must help in separating the failure from other non defective components. This evaluation was verified empirically: The best diagnostic accuracy that could be achieved for the model #2 was about 65%.

What is claimed is:

1. A computer implemented method for automatically evaluating Bayesian network models for decision support comprising an act of causing a computer to perform operations of:

receiving a Bayesian Network (BN) model including evidence nodes and conclusion nodes, where the conclusion nodes are linked with the evidence nodes by causal dependency links, and where the evidence nodes have evidence states and the conclusion nodes have conclusion states;

setting the states of the conclusion nodes to desired conclusion states and determining, by propagating down the causal dependency links, a corresponding probability of occurrence of evidence states of the evidence nodes and producing, from the probability of occurrence, a plurality of samples of most likely states of the evidence nodes;

setting the states of the evidence nodes to states corresponding to the plurality of samples of the evidence states, and propagating the evidence states back up the causal dependency links to the conclusion nodes, to obtain a plurality of probabilities of the resulting states of the conclusion nodes; and outputting a representation of the plurality of the probabilities of the resulting states of the conclusion nodes.

2. A method for automatically evaluating Bayesian network models for decision support as set forth in claim 1, wherein the BN model further includes at least one auxiliary node causally linked between at least one evidence node and at least one conclusion node.

3. A method for automatically evaluating Bayesian network models for decision support as set forth in claim 2, wherein the sampling is performed by a Monte Carlo algorithm.

4. A method for automatically evaluating Bayesian network models for decision support, as set forth in claim 3, wherein the outputted representation is a complete representation of probabilities of states for all conclusions given a particular set of combinations of conclusion states.

5. A method for automatically evaluating Bayesian network models for decision support as set forth in claim 4, wherein the outputted representation is a graphical representation.

6. A method for automatically evaluating Bayesian network models for decision support as set forth in claim 4, wherein the outputted representation is a matrix of averages of probabilities of the conclusion states for implicated conclusions versus a selected set of combinations of conclusion states; whereby a user can determine an accuracy of the BN model's propensity to yield proper conclusions.

7. A method for automatically evaluating Bayesian network models for decision support as set forth in claim 6, wherein the outputted representation is a graphical representation in the form of a two-dimensional intensity matrix and a three-dimensional bar chart.

8. A method for automatically evaluating Bayesian network models for decision support as set forth in claim 7, wherein the conclusion nodes are weighted by weights representing their importance; whereby the accuracy of the BN model's propensity to yield proper conclusions may be weighted for particular conclusions based on their relative importance.

9. A method for automatically evaluating Bayesian network models for decision support as set forth in claim 8, wherein the BN model models a diagnostic domain, with the conclusion nodes representing component failures or diseases, the evidence nodes representing recognizable symptoms of those failures or diseases, and the auxiliary nodes representing additional information useful, in conjunction with the evidence nodes and conclusion nodes.

10. A method for automatically evaluating Bayesian network models for decision support as set forth in claim 1, wherein the sampling is performed by a Monte Carlo algorithm.

11. A method for automatically evaluating Bayesian network models for decision support, as set forth in claim 1, wherein the outputted representation is a complete representation of probabilities of states for all conclusions given a particular set of combinations of conclusion states.

12. A method for automatically evaluating Bayesian network models for decision support as set forth in claim 1, wherein the outputted representation is a graphical representation.

13. A method for automatically evaluating Bayesian network models for decision support as set forth in claim 1, wherein the outputted representation is a matrix of averages of probabilities of the conclusion states for implicated conclusions versus a selected set of combinations of conclusion states; whereby a user can determine an accuracy of the BN model's propensity to yield proper conclusions.

14. A method for automatically evaluating Bayesian network models for decision support as set forth in claim 1, wherein the outputted representation is a graphical representation in the form of a two-dimensional intensity matrix and a three-dimensional bar chart.

15. A method for automatically evaluating Bayesian network models for decision support as set forth in claim 1, wherein the conclusion nodes are weighted by weights representing their importance; whereby an accuracy of the BN model's propensity to yield proper conclusions may be weighted for particular conclusions based on their relative importance.

16. A method for automatically evaluating Bayesian network models for decision support as set forth in claim 1, wherein the BN model models a diagnostic domain, with the conclusion nodes representing component failures or diseases, the evidence nodes representing recognizable symptoms of those failures or diseases, and the auxiliary nodes representing additional information useful, in conjunction with the evidence nodes and conclusion nodes.

17. An apparatus for automatically evaluating Bayesian network models for decision support, the apparatus comprising a computer system including a processor, a memory coupled with the processor, an input coupled with the processor for receiving user input and data input, and an output coupled with the processor for outputting display data, wherein the computer system further comprises means, residing in its processor and memory, for:

receiving a Bayesian Network (BN) model including evidence nodes and conclusion nodes, where the conclusion nodes are linked with the evidence nodes by causal dependency links, and where the evidence nodes have evidence states and the conclusion nodes have conclusion states;

setting the states of the conclusion nodes to desired conclusion states and determining, by propagating down the causal dependency links, a corresponding probability of occurrence of evidence states of the evidence nodes and producing, from the probability of occurrence, a plurality of samples of most likely states of the evidence nodes;

setting the states of the evidence nodes to states corresponding to the plurality of samples of the evidence states, and propagating the evidence states back up the causal dependency links to the conclusion nodes, to obtain a plurality of probabilities of the resulting states of the conclusion nodes; and outputting a representation of the plurality of the probabilities of the resulting states of the conclusion nodes.

18. An apparatus for automatically evaluating Bayesian network models for decision support as set forth in claim 17, wherein the BN model further includes at least one auxiliary node causally linked between at least one evidence node and at least one conclusion node.

19. An apparatus for automatically evaluating Bayesian network models for decision support as set forth in claim 18, wherein the sampling is performed by a Monte Carlo algorithm.

20. An apparatus for automatically evaluating Bayesian network models for decision support, as set forth in claim 19, wherein the outputted representation is a complete representation of probabilities of states for all conclusions given a particular set of combinations of conclusion states.

21. An apparatus for automatically evaluating Bayesian network models for decision support as set forth in claim 20, wherein the outputted representation is a graphical representation.

22. An apparatus for automatically evaluating Bayesian network models for decision support as set forth in claim 20, wherein the outputted representation is a matrix of averages of probabilities of the conclusion states for implicated conclusions versus a selected set of combinations of conclusion states; whereby a user can determine an accuracy of the BN model's propensity to yield proper conclusions.

23. An apparatus for automatically evaluating Bayesian network models for decision support as set forth in claim 22, wherein the outputted representation is a graphical representation in the form of a two-dimensional intensity matrix and a three-dimensional bar chart.

24. An apparatus for automatically evaluating Bayesian network models for decision support as set forth in claim 23, wherein the conclusion nodes are weighted by weights representing their importance; whereby the accuracy of the BN model's propensity to yield proper conclusions may be weighted for particular conclusions based on their relative importance.

25. An apparatus for automatically evaluating Bayesian network models for decision support as set forth in claim 24, wherein the BN model models a diagnostic domain, with the conclusion nodes representing component failures or diseases, the evidence nodes representing recognizable symptoms of those failures or diseases, and the auxiliary nodes representing additional information useful, in conjunction with the evidence nodes and conclusion nodes.

26. An apparatus for automatically evaluating Bayesian network models for decision support as set forth in claim 17, wherein the sampling is performed by a Monte Carlo algorithm.

27. An apparatus for automatically evaluating Bayesian network models for decision support, as set forth in claim 17, wherein the outputted representation is a complete representation of probabilities of states for all conclusions given a particular set of combinations of conclusion states.

28. An apparatus for automatically evaluating Bayesian network models for decision support as set forth in claim 17, wherein the outputted representation is a graphical representation.

29. An apparatus for automatically evaluating Bayesian network models for decision support as set forth in claim 17, wherein the outputted representation is a matrix of averages of probabilities of the conclusion states for implicated conclusions versus a selected set of combinations of conclusion states; whereby a user can determine the accuracy of the BN model's propensity to yield proper conclusions.

30. An apparatus for automatically evaluating Bayesian network models for decision support as set forth in claim 17, wherein the outputted representation is a graphical representation in the form of a two-dimensional intensity matrix and a three-dimensional bar chart.

31. An apparatus for automatically evaluating Bayesian network models for decision support as set forth in claim 17, wherein the conclusion nodes are weighted by weights representing their importance; whereby an accuracy of the BN model's propensity to yield proper conclusions may be weighted for particular conclusions based on their relative importance.

32. An apparatus for automatically evaluating Bayesian network models for decision support as set forth in claim 17, wherein the BN model models a diagnostic domain, with the conclusion nodes representing component failures or diseases, the evidence nodes representing recognizable symptoms of those failures or diseases, and the auxiliary nodes representing additional information useful, in conjunction with the evidence nodes and conclusion nodes.

33. An apparatus for automatically evaluating Bayesian network models for decision support, the apparatus comprising a computer system including a processor, a memory coupled with the processor, an input coupled with the processor for receiving user input and data input, and an output coupled with the processor for outputting display data, wherein:

the input is configured for receiving a Bayesian Network (BN) model including evidence nodes and conclusion nodes, where the conclusion nodes are linked with the evidence nodes by causal dependency links, and where the evidence nodes have evidence states and the conclusion nodes have conclusion states;

the processor is configured for setting the states of the conclusion nodes to desired conclusion states and determining, by propagating down the causal dependency links, a corresponding probability of occurrence of evidence states of the evidence nodes and producing, from the probability of occurrence, a plurality of samples of most likely states of the evidence nodes; and for setting the states of the evidence nodes to states corresponding to the plurality of samples of the evidence states, and propagating the evidence states back up the causal dependency links to the conclusion nodes, to obtain a plurality of probabilities of the resulting states of the conclusion nodes; and the output is configured for outputting a representation of the plurality of the probabilities of the resulting states of the conclusion nodes.

34. An apparatus for automatically evaluating Bayesian network models for decision support as set forth in claim 33, wherein the BN model further includes at least one auxiliary node causally linked between at least one evidence node and at least one conclusion node.

35. An apparatus for automatically evaluating Bayesian network models for decision support as set forth in claim 34, wherein the sampling is performed by a Monte Carlo algorithm.

36. An apparatus for automatically evaluating Bayesian network models for decision support, as set forth in claim 35, wherein the outputted representation is a complete representation of probabilities of states for all conclusions given a particular set of combinations of conclusion states.

37. An apparatus for automatically evaluating Bayesian network models for decision support as set forth in claim 36, wherein the outputted representation is a graphical representation.

38. An apparatus for automatically evaluating Bayesian network models for decision support as set forth in claim 36, wherein the outputted representation is a matrix of averages of probabilities of the conclusion states for implicated conclusions versus a selected set of combinations of conclusion states; whereby a user can determine an accuracy of the BN model's propensity to yield proper conclusions.

39. An apparatus for automatically evaluating Bayesian network models for decision support as set forth in claim 38, wherein the outputted representation is a graphical representation in the form of a two-dimensional intensity matrix and a three-dimensional bar chart.

40. An apparatus for automatically evaluating Bayesian network models for decision support as set forth in claim 39, wherein the conclusion nodes are weighted by weights representing their importance; whereby the accuracy of the BN model's propensity to yield proper conclusions may be weighted for particular conclusions based on their relative importance.

41. An apparatus for automatically evaluating Bayesian network models for decision support as set forth in claim 40, wherein the BN model models a diagnostic domain, with the conclusion nodes representing component failures or diseases, the evidence nodes representing recognizable symptoms of those failures or diseases, and the auxiliary nodes representing additional information useful, in conjunction with the evidence nodes and conclusion nodes.

42. An apparatus for automatically evaluating Bayesian network models for decision support as set forth in claim 33, wherein the sampling is performed by a Monte Carlo algorithm.

43. An apparatus for automatically evaluating Bayesian network models for decision support, as set forth in claim 33, wherein the outputted representation is a complete representation of probabilities of states for all conclusions given a particular set of combinations of conclusion states.

44. An apparatus for automatically evaluating Bayesian network models for decision support as set forth in claim 33, wherein the outputted representation is a graphical representation.

45. An apparatus for automatically evaluating Bayesian network models for decision support as set forth in claim 33, wherein the outputted representation is a matrix of averages of probabilities of the conclusion states for implicated conclusions versus a selected set of combinations of conclusion states; whereby a user can determine an accuracy of the BN model's propensity to yield proper conclusions.

46. An apparatus for automatically evaluating Bayesian network models for decision support as set forth in claim 33, wherein the outputted representation is a graphical representation in the form of a two-dimensional intensity matrix and a three-dimensional bar chart.

47. An apparatus for automatically evaluating Bayesian network models for decision support as set forth in claim 33, wherein the conclusion nodes are weighted by weights representing their importance; whereby an accuracy of the BN model's propensity to yield proper conclusions may be weighted for particular conclusions based on their relative importance.

48. An apparatus for automatically evaluating Bayesian network models for decision support as set forth in claim 33, wherein the BN model models a diagnostic domain, with the conclusion nodes representing component failures or diseases, the evidence nodes representing recognizable symptoms of those failures or diseases, and the auxiliary nodes representing additional information useful, in conjunction with the evidence nodes and conclusion nodes.

49. A computer program product for automatically evaluating Bayesian network models for decision support, the computer program product comprising means, encoded in a computer-readable medium for:

receiving a Bayesian Network (BN) model including evidence nodes and conclusion nodes, where the conclusion nodes are linked with the evidence nodes by causal dependency links, and where the evidence nodes have evidence states and the conclusion nodes have conclusion states;

setting the states of the conclusion nodes to desired conclusion states and determining, by propagating down the causal dependency links, a corresponding probability of occurrence of evidence states of the evidence nodes and producing, from the probability of occurrence, a plurality of samples of most likely states of the evidence nodes;

setting the states of the evidence nodes to states corresponding to the plurality of samples of the evidence states, and propagating the evidence states back up the causal dependency links to the conclusion nodes, to obtain a plurality of probabilities of the resulting states of the conclusion nodes; and outputting a representation of the plurality of the probabilities of the resulting states of the conclusion nodes.

50. A computer program product for automatically evaluating Bayesian network models for decision support as set forth in claim 49, wherein the BN model further includes at least one auxiliary node causally linked between at least one evidence node and at least one conclusion node.

51. A computer program product for automatically evaluating Bayesian network models for decision support as set forth in claim 50, wherein the sampling is performed by a Monte Carlo algorithm.

52. A computer program product for automatically evaluating Bayesian network models for decision support, as set forth in claim 51, wherein the outputted representation is a complete representation of probabilities of states for all conclusions given a particular set of combinations of conclusion states.

53. A computer program product for automatically evaluating Bayesian network models for decision support as set forth in claim 52, wherein the outputted representation is a graphical representation.

54. A computer program product for automatically evaluating Bayesian network models for decision support as set forth in claim 52, wherein the outputted representation is a matrix of averages of probabilities of the conclusion states for implicated conclusions versus a selected set of combinations of conclusion states; whereby a user can determine an accuracy of the BN model's propensity to yield proper conclusions.

55. A computer program product for automatically evaluating Bayesian network models for decision support as set forth in claim 54, wherein the outputted representation is a graphical representation in the form of a two-dimensional intensity matrix and a three-dimensional bar chart.

56. A computer program product for automatically evaluating Bayesian network models for decision support as set forth in claim 55, wherein the conclusion nodes are weighted by weights representing their importance; whereby the accuracy of the BN model's propensity to yield proper conclusions may be weighted for particular conclusions based on their relative importance.

57. A computer program product for automatically evaluating Bayesian network models for decision support as set forth in claim 56, wherein the BN model models a diagnostic domain, with the conclusion nodes representing component failures or diseases, the evidence nodes representing recognizable symptoms of those failures or diseases, and the auxiliary nodes representing additional information useful, in conjunction with the evidence nodes and conclusion nodes.

58. A computer program product for automatically evaluating Bayesian network models for decision support as set forth in claim 49, wherein the sampling is performed by a Monte Carlo algorithm.

59. A computer program product for automatically evaluating Bayesian network models for decision support, as set forth in claim 49, wherein the outputted representation is a complete representation of probabilities of states for all conclusions given a particular set of combinations of conclusion states.

60. A computer program product for automatically evaluating Bayesian network models for decision support as set forth in claim 49, wherein the outputted representation is a graphical representation.

61. A computer program product for automatically evaluating Bayesian network models for decision support as set forth in claim 49, wherein the outputted representation is a matrix of averages of probabilities of the conclusion states for implicated conclusions versus a selected set of combinations of conclusion states; whereby a user can determine an accuracy of the BN model's propensity to yield proper conclusions.

62. A computer program product for automatically evaluating Bayesian network models for decision support as set forth in claim 49, wherein the outputted representation is a graphical representation in the form of a two-dimensional intensity matrix and a three-dimensional bar chart.

63. A computer program product for automatically evaluating Bayesian network models for decision support as set forth in claim 49, wherein the conclusion nodes are weighted by weights representing their importance; whereby the accuracy of the BN model's propensity to yield proper conclusions may be weighted for particular conclusions based on their relative importance.

64. A computer program product for automatically evaluating Bayesian network models for decision support as set forth in claim 49, wherein the BN model models a diagnostic domain, with the conclusion nodes representing component failures or diseases, the evidence nodes representing recognizable symptoms of those failures or diseases, and the auxiliary nodes representing additional information useful, in conjunction with the evidence nodes and conclusion nodes.

* * * * *